US006321084B1

(12) United States Patent
Horrer

(10) Patent No.: US 6,321,084 B1
(45) Date of Patent: Nov. 20, 2001

(54) METHOD FOR SETTING UP A TELECOMMUNICATION LINK TO PERSONS IN CLOSED FACILITIES, SUCH AS PASSENGER TRANSPORT MEANS, AS WELL AS A TELECOMMUNICATION SYSTEM AND NETWORK

(75) Inventor: Matthias Horrer, Raleigh, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/200,958

(22) Filed: Nov. 30, 1998

(30) Foreign Application Priority Data

Dec. 1, 1997 (DE) ............................................. 197 53 228

(51) Int. Cl.$^7$ ...................................................... H04Q 7/26
(52) U.S. Cl. ........................... 455/431; 455/414; 455/445
(58) Field of Search ..................................... 455/431, 432, 455/435, 458, 445, 558, 554, 555, 414

(56) References Cited

U.S. PATENT DOCUMENTS

| 5,559,865 | * | 9/1996 | Gilhousen | 455/431 |
| 5,950,129 | * | 9/1999 | Schmid et al. | 455/431 |
| 5,956,639 | * | 9/1999 | Armbruster et al. | 455/435 |
| 6,002,929 | * | 12/1999 | Bishop, Jr. et al. | 455/431 |
| 6,052,604 | * | 4/2000 | Bishop, Jr. et al. | 455/458 |

FOREIGN PATENT DOCUMENTS

2310973 A 9/1997 (GB) .
WO 94/28684 12/1994 (WO) .

* cited by examiner

Primary Examiner—Edward F. Urban
(74) Attorney, Agent, or Firm—Sughrue, Mion, Zinn, Macpeak & Seas, PLLC

(57) ABSTRACT

To set up a telecommunication link to a person who is in a substantially enclosed facility such as an airplane, inside which there are several internal communication transmitting terminals operated by a private branch exchange of the facility, a personal call number is assigned to a private telecommunication transmitting terminal of the person in a public telecommunication network at least during the person's stay in the facility, the assignment is stored of his/her personal call number to the internal communication transmitting terminal assigned to the person during his/her stay in the facility. A call directed to the personal call number of the person is rerouted together with the personal call number or a corresponding ID to the private branch exchange. The internal communication transmitting terminal assigned to the personal call number/ID is then determined using the stored assignment and the call is forwarded to this internal communication transmitting terminal, whereby the person remains able to be reached under his/her personal call number.

12 Claims, 2 Drawing Sheets

Fig.1

METHOD FOR SETTING UP A TELECOMMUNICATION LINK TO PERSONS IN CLOSED FACILITIES, SUCH AS PASSENGER TRANSPORT MEANS, AS WELL AS A TELECOMMUNICATION SYSTEM AND NETWORK

BACKGROUND OF THE INVENTION

The present invention relates to a method for setting up a telecommunication link to a person who is in a stationary or mobile, substantially enclosed facility, in particular in a building or in a passenger transport means (e.g., an airplane), inside which there are several communication transmitting terminals operated by a private branch exchange of the facility, whereby a (personal) call number in a telecommunication network, in particular a public one, is assigned to a private telecommunication transmitting terminal of the person, e.g., a radiotelephone. In addition, the invention relates to a corresponding telecommunication system for stationary or mobile facilities each forming a substantially enclosed unit, in particular for buildings or passenger transport means, with a private branch exchange provided inside the facility and able to be called from outside the facility, and with several (internal) communication transmitting terminals provided inside the facility and operated by the private branch exchange, as well as a corresponding telecommunication network.

In general, methods and telecommunication systems are known, for example in the area of office communication, in which calls from a private branch exchange (i.e., a switching center) are forwarded to corresponding private branch exchange terminals, in particular to telephones.

In addition, telecommunication systems with mobile radiotelephone telecommunication transmitting terminals, so-called mobile radiotelephone systems, are known that offer a high degree of mobility. Each subscriber is assigned a personal call number under which he can always be reached, as long as he is in the coverage area of the mobile radiotelephone system.

It is known from German patent DE 196 18 531 C1 to forward a call from a telecommunication network, namely the GSM (Global System for Mobile Communications) mobile radiotelephone network, to a private branch exchange of a private network, namely to a DECT (Digital Enhanced Cordless Telephone) system, if the subscriber is in an enclosed facility, for example inside his office, where the private branch exchange is installed. The private branch exchange described therein is connected via lines with the mobile radiotelephone switching center. The call is rerouted from there together with a call number, the so-called "private branch routing number" to the private branch exchange. This call number, instead of the location data (the so-called "location area identity"), is registered in the subscriber file of the mobile radiotelephone system, and shows how the subscriber can be reached through the private branch exchange in the private network. However, it is not described in DE 196 18 531 how the call is forwarded from the private branch exchange to the communication transmitting terminal (DECT handset) that the subscriber can use. The described call rerouting is not possible if the subscriber has left the coverage area of the mobile radiotelephone system and is in a moving facility, for example in an airplane. Precisely for business customers, for whom airplane trips are an everyday occurrence, the ability to also be reached in the airplane would be desirable, to be able to use the time in the airplane more productively.

At present, only telephone conversations can be transmitted from the airplane to a subscriber on the ground using a credit card or a telephone credit card or calling card, for which telephones are increasingly situated at almost every seat in the airplane.

Thus, for example, U.S. Pat. No. 5,592,539 discloses a telecommunication system in which a call transmitted by a flight passenger from an airplane is received by a ground station and forwarded to a special target station of a ground-supported telecommunication network. For this purpose, a phone station with credit card reader is provided in the airplane, through which the telecommunication takes place with the radio ground station.

In other substantially enclosed facilities as well, such as in ships or trains, and also in facilities such as underground mines, for which telecommunication cannot take place via the public telecommunication network or for which an electromagnetic radio link cannot be made due to interference or for other reasons, e.g., for safety reasons, a person's ability to also be reached within these facilities would be extremely desirable.

SUMMARY OF THE INVENTION

The present invention is therefore directed to a method and a telecommunication system by which a person subscribing to a telecommunication network continues to be reachable in stationary or mobile, substantially enclosed facilities under his/her personal call number.

In the method according to the invention, at least during the respective person's stay in the enclosed facility, a record is stored of the assignment of his/her personal call number to an internal communication transmitting terminal serving the enclosed facility, so that a call directed to the private telecommunication transmitting terminal of the person in the public network is rerouted together with the personal call number to the private branch exchange and that, by means of the stored assignment, the internal communication transmitting terminal assigned to the personal call number is determined and the call is forwarded to this internal communication transmitting terminal.

Thus, at least during the person's stay in the facility, the assignment of his/her personal call number to that internal communication transmitting terminal that is assigned to the person during his/her stay in the enclosed facility is stored, so that a call directed to the personal call number of the person is rerouted to the private branch exchange. By means of the stored assignment, the internal communication transmitting terminal assigned to the personal call number / ID is determined, and the call is forwarded to this internal communication transmitting terminal.

In this way, for example, the internal communication transmitting terminals (e.g., on-board telephones) already provided for outgoing calls in an airplane can now also be used for incoming calls according to the invention. For this, the corresponding airline installs for each airplane a special call number that is used by flight passengers as call routing number for calls directed to their personal call number. The private branch exchange in the airplane can be reached under this special call number. Since the personal call number of the subscriber (i.e., the flight passenger) or a unique ID (e.g., a seat number) is also transmitted along, the call can be forwarded to the subscriber after the internal on-board telephone assigned to him has been determined by means of the personal call number and/or ID.

The ID can be available for example as a so-called calling party address (CgPA). The call rerouting can be supplemented by a time-dependency, in order to reroute all calls for the subscriber to this special call number only as of a specific time.

In an advantageous design of the invention, the communication link between the private branch exchange and its internal communication transmitting terminals is made in a wireless manner, in particular by means of infrared signals via infrared telephones that are used as mobile components. If electromagnetic interference inside the facility is not a problem, the internal communication transmitting terminals may also be radiotelephones, in particular the personal mobile radiotelephones of the subscribers (flight passengers).

The assignment of the personal call numbers by the private telecommunication transmitting terminal to the respective internal communication transmitting terminal as well as the call rerouting can take place in the facility via the internal communication transmitting terminals assigned there, that is, in an airplane it can take place via the respective internal on-board telephone provided at the seat. Each flight passenger can register with the private branch exchange via the internal on-board telephone in a decentralized manner by means of a data carrier situated in his mobile telecommunication transmitting terminal, in particular by means of his SIM (Subscriber Identification Module) card. In this connection, an assignment is produced between his personal call number and the internal on-board telephone using its internal call number or using the seat number; and this assignment is stored in the private branch exchange or in a database situated on the transmitting terminal. The assignment can also be made in a centralized manner in that, when entering the facility, the personal call numbers of the persons to whom an internal communication transmitting terminal is to be assigned in the facility are already collected and stored together in each case with the ID of the assigned internal communication transmitting terminal, i.e., with its internal call number or with the seat number. Accordingly, the rerouting of calls directed to personal call numbers to the private branch exchange can be triggered in a centralized manner immediately on entering the facility.

Particularly for a telecommunication link with an airplane or with a ship, it is advantageous when the telecommunication link between the private telecommunication transmitting terminal and the private branch exchange is made in a centralized manner via a radio base station on the ground. This radio base station is, e.g., a satellite radio station which produces, in addition to the typical operating radio transmission, also the telecommunication link with the airplane and/or its private branch exchange. The assignment of a flight passenger's personal call number to his internal telephone assigned in the airplane can already take place in the radio base station and a rerouted call can be forwarded to the airplane's private branch exchange together with an ID corresponding to the personal call number, e.g. with the seat number or with the internal call number of the internal telephone assigned to this seat.

In the case of stationary facilities, in particular buildings or also underground mines, the communication with the private branch exchange can take place in wired manner via a corresponding base station and via connection lines. In the case of mobile facilities, in particular airplanes or ships, the telecommunication link with the private branch exchange is made in a wireless manner via a corresponding radio base station.

With a telecommunication system of kind mentioned above, the above-mentioned technical problem is solved by an assigning facility in which at least during the respective person's stay in the facility, an assignment is stored of his/her personal call number to that internal communication transmitting terminal that is assigned to the person during his/her stay in the facility, in order to reroute a call directed at the person's telecommunication transmitting terminal to the private branch exchange together with the personal call number, whereby the assigning facility, using the stored assignment, determines the internal communication transmitting terminal assigned to the personal call number and controls the call rerouting to this internal communication transmitting terminal.

Accordingly, there is an assigning facility in which is stored the assignment of the personal call number of a private telecommunication transmitting terminal of a public telecommunication network to that internal communication transmitting terminal that is assigned to the person at least during his/her stay in the facility, whereby a call directed at the personal call number and rerouted together with this personal call number or a corresponding ID after exchanging information with the assigning facility, is forwarded to the corresponding internal communication transmitting terminal of the private branch exchange. The advantages already described above with regard to the method can be achieved with this telecommunication system.

In a preferred form of construction of the telecommunication system according to the invention, the private branch exchange is a so-called PBX (Private Branch eXchange) or a PABX (Private Automatic Branch exchange).

In facilities in which electromagnetic interference does not represent a problem, the communication link between the private branch exchange and its internal communication transmitting terminals can be made in a wireless manner with electromagnetic radio signals. For an interference-free, wireless communication, infrared telephones can also be used as internal communication transmitting terminals.

The assigning facility is preferably a computer-controlled database which may be situated inside the facility, for example, e.g. on board the airplane. Using the personal call number transmitted along, the assignment of the personal call number to the respective internal telephone takes place only when on board the airplane by means of the database.

In a preferred form of construction, a radio base station is provided by means of which the telecommunication between the public telecommunication network and the private branch exchange is carried out in a centralized manner. In this case, the assigning facility (database) may be part of an intelligent network, in such a way that the assignment can already take place on the ground via the intelligent network. Then only a corresponding ID (e.g. the seat number) designating the assigned internal communication transmitting terminal in the airplane needs to be transmitted along to the private branch exchange in the airplane, so that the rerouted call can be forwarded from the private branch exchange to the internal telephone corresponding to this ID.

In a preferred development of this form of construction, a reading device that is in a data link with the assigning facility or the radio base station is provided, by means of which data from the private telecommunication transmitting terminal assigned to a person, e.g., a mobile telephone, can be read and/or the call rerouting to the internal communication transmitting terminal can be triggered.

When a flight passenger is assigned a seat at check-in, data on the flight passenger's mobile phone are also obtained and stored together with the seat number in the assignment facility. This can take place automatically, and this data can be filed separately so that no problems occur with other data of the airline. Such a separate assignment facility can then be accessed in the case of a rerouted call. If the internal telephones existing in the airplane are each addressed in seat-related manner, a rerouted call can already be unmistakably forwarded to the corresponding internal telephone in the airplane using the seat number transmitted along.

The call rerouting and the assignment of an internal communication transmitting terminal can be carried out particularly easily if the reading device is a card reader for a data carrier that is intended for the use of a mobile, private telecommunication transmitting terminal and is designated as a SIM card (Subscriber Identity Module). The flight passengers can already carry out a corresponding registration or subscription during check-in by inserting e.g. the SIM card of their private mobile telephone into the card reader for a data exchange, in particular for the assigning of their personal call number to the internal telephone respectively assigned to them in the airplane.

If the assignment facility is connected via a data link with the radio base station, a fixed, seat-related addressing of the internal telephones of an airplane is possible, in such a way that the assignment of the personal call numbers to the internal telephones can take place in an assignment facility on the ground.

In an alternative form of the invention, the assignment facility is connected via a data link with the private branch exchange, in contrast, in such a way that the assignment to the respective internal telephone takes place only in the airplane, by means of the personal call number transmitted along.

Finally, the invention also comprises a telecommunication network for passenger transport companies, in particular for airlines, ocean lines or railroad companies, comprising preferably not public telecommunication system as described above, and at least two private branch exchanges each provided in a passenger transport means (e.g., an airplane) and each of which is assigned its own special call number of a (e.g., public) telecommunication network. By means of such a telecommunication network, the calls—rerouted to special call numbers—of the public telecommunication network are each forwarded to the corresponding private branch exchange in the respective airplane.

Further advantages can be seen from the description and the drawings. Likewise, the aforementioned features and those described below can each be used individually or several at a time in any desired combinations, according to the invention. The illustrated and described form of construction is not to be understood as limiting, but rather as an example for illustrating the invention.

BRIEF DESCRIPTION OF THE DRAWING

The invention will be more clearly understood from the following description in conjunction with the accompanying drawing, wherein.

DETAILED DESCRIPTION OF THE INVENTION

Figure 1:
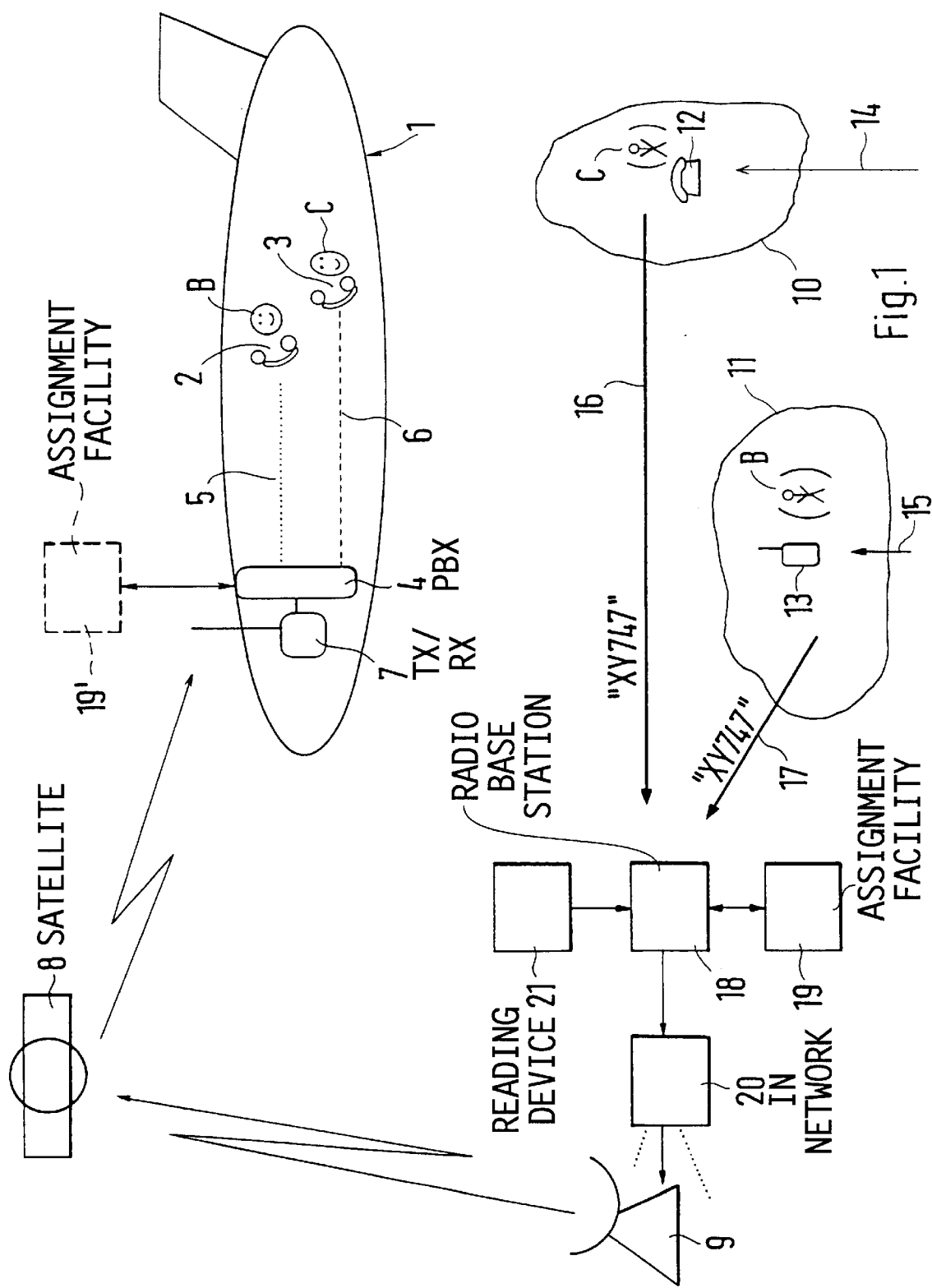
FIG. 1 shows in schematic form a telecommunication system according to the invention in the example of an airplane.

An airplane shown in FIG. 1 is equipped with several internal communication transmitting terminals in the form of telephones, of which only two are shown as examples with the reference numbers 2 and 3. Such an internal communication transmitting terminal is preferably situated at each airplane seat. All internal communication transmitting terminals 2, 3 are connected to a private branch exchange PBX 4 and are operated by it alone. The communication link 5, 6 between the private branch exchange 4 and its internal communication transmitting terminals 2, 3 can be made in wireless manner or via connection lines. The private branch exchange 4 is a private branch exchange and is connected to a transceiver unit TX1RX 7 arranged in the airplane 1 and via which, by means of a satellite 8, radio signals can be exchanged with a radio base station 9 situated on the ground.

A special call number "XY747" installed by the airline is used by flight passengers who are subscribers to a Public Switched Telecommunications Network (PSTN) telecommunication network 10 or are subscribers to a mobile radiotelephone network 11, such as GSM (Global System for Mobile Communications). This special call number is used as a call rerouting number for the private telecommunication transmitting terminal 12, 13. This special call number "XY747" is the same for all passengers of the airplane 1.

The private telecommunication transmitting terminal can be a stationary telephone 12 or mobile phone 13. In this example, the person (subscriber) B has a private mobile radiotelephone connection and can be reached in the mobile radiotelephone network 11 under his personal call number (arrow 15). The person C is a subscriber of the public telecommunication network 10 and has a conventional telephone connection to which a call number is assigned. The subscriber C can be reached under this call number (arrow 14). If the persons (subscribers) are outside of their telecommunication networks, they should still be able to be reached. For example, as flight passengers, B and C are in seats no. 2 and 3, respectively, on board the airplane 1 to which the special call number "XY747" was assigned.

If a private telecommunication transmitting terminal, e.g., the mobile phone 13 of subscriber B, is then called under his personal call number, this call 15 together with the personal call number is treated as a rerouted call 17 and routed under the special call number "XY747" to a radio base station 18 which represents in this case a service control point SCP of an IN network 20. By means of an assignment facility 19—which is in a data link with the radio base station 18—in which the assignment of the subscriber's (flight passenger's) personal call number to the seat assigned to him in the airplane 1 is stored, the assigned seat number is determined using the personal call number transmitted along. This seat number (ID) is converted into a switchable number (routing number) and forwarded with the call to a service switching point SSP in the IN network 20. From there, the call is forwarded via the radio base station 9, the satellite 8 and the transceiver unit 7 installed in the airplane, to the private branch exchange 4 there, which in turn forwards the call, according to the seat number transmitted along, to the internal communication transmitting terminal 2 situated at this seat.

In addition, a reading device 21 is in a data link with the radio base station 18 shown in FIG. 1; by means of the reading device, the data of a flight passenger's mobile private telecommunication transmitting terminal 13 can be read when he checks in. This data is automatically stored in the assignment facility 19 together with the seat number assigned to the flight passenger.

In place of a ground-supported assignment facility 19, the assignment can also take place via an assignment facility 19, provided in the airplane 1 and which is in a data link with the private branch exchange 4 and in which the assignment of the personal call numbers to the respective seats is stored. Using the personal call number, which is forwarded together with the call to the private branch exchange 4, after the assignment facility 19, is accessed, the forwarding to the internal communication transmitting terminal 2 assigned to the personal call number then takes place.

The method according to the invention will now be described in more detail with the help of FIG. 2, whereby FIG. 1 is also referred to.

Figure 2:
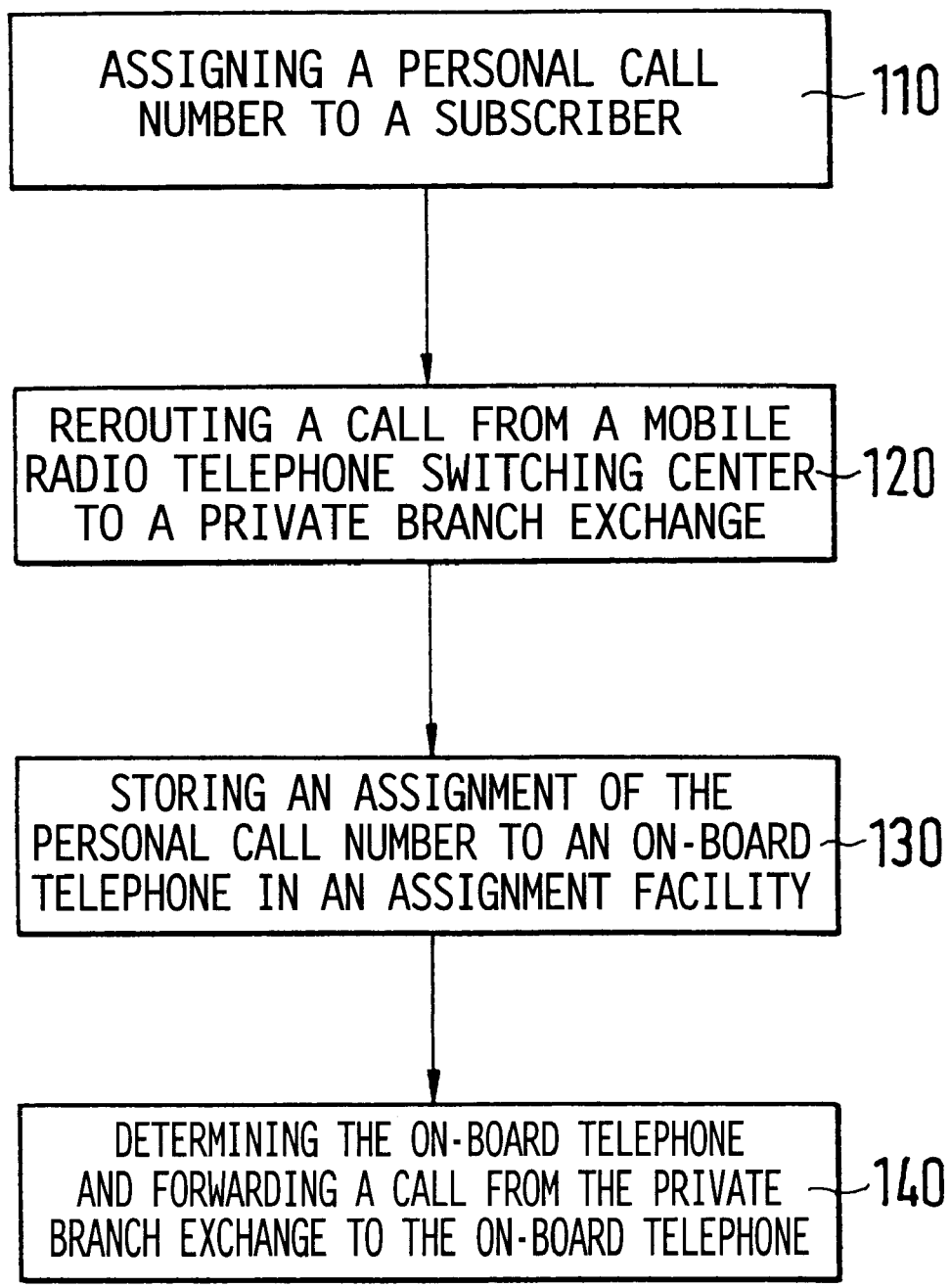
FIG. 2 shows the flow chart for a method according to the invention for setting up a telecommunication link in the telecommunication system.

FIG. 2 shows the flow chart of the method 100, in which subscriber B is assigned his personal call number in a first step 110. When the subscriber stays in the coverage area of the mobile radiotelephone system, he can always be reached under this call number.

But now the subscriber is a passenger on board the airplane 1 shown in FIG. 1. A call that comes in to the mobile radiotelephone switching center is therefore rerouted in a subsequent step 120 to the private branch exchange 4 installed in the airplane.

The assignment of the personal call number to the on-board telephone 2 of the subscriber is then stored in the assignment facility 19 in a step 130.

Using this assignment, when the call comes in, the terminal, namely the onboard telephone 2, is then determined in a step 140. The call is then forwarded from the private branch exchange 4 to this on-board telephone 2.

What is claimed is:

1. A method for setting up a telecommunication link to at least one person in a substantially enclosed facility inside which there are several internal communication transmitting terminals operated by a private branch exchange of the facility, said method comprising the steps of assigning said person a personal call number to use a private telecommunication transmitting terminal arranged in a telecommunication network outside of the facility, rerouting a call, directed at said private telecommunication transmitting terminal, together with an identification number to the private branch exchange and by means of said identification number, determining the internal communication transmitting terminal, and forwarding the call to the determined internal communication transmitting terminal, wherein the identification number corresponds to the personal number of said person, wherein, at least during said person's stay in the facility, said method further includes the step of storing an assignment of said person's personal call number to the identification number identifying the internal communication transmitting terminal that is assigned to the person during said person's stay in the facility, and wherein said assignment is made outside said facility.

2. A method according to claim 1, characterized in that the telecommunication link between the private telecommunication transmitting terminal and the private branch exchange is made via a radio base station on the ground.

3. A method according to claim 1, characterized in that the telecommunication link between the private branch exchange and its internal communication transmitting terminals is made in a wireless manner.

4. A method according to claim 1, characterized in that when the facility is entered, the personal call numbers of each person to whom an internal communication transmitting terminal is assigned are stored in an assigning facility, and that a call rerouting from the private telecommunication transmitting terminal to the internal communication transmitting terminal is switched.

5. A telecommunication system for a substantially enclosed facility, including a private branch exchange provided inside said facility and able to be called from outside the facility and with several internal communication transmitting terminals provided inside the facility, operated by the private branch exchange and assigned to persons who are inside the facility to whom in each case a personal call number is assigned to use a private telecommunication network outside of the facility, wherein in said system the private branch exchange receives from a switching facility of the telecommunication network a call directed to the private telecommunication transmitting terminal of the person together with an identification number and, by means of this identification number, determines the internal communication transmitting terminal and forwards the call to this internal communication transmitting terminal, wherein the identification number corresponds to the personal call number of the person, and wherein an assigning facility is located outside said enclosed facility, which, at least during the person's stay in the enclosed facility, stores an assignment of said person's personal call number to the identification number identifying the internal communication transmitting terminal that is assigned to the person during said person's stay in the enclosed facility and which, by means of the stored assignment, controls the call rerouting to this internal communication transmitting terminal.

6. A telecommunication system according to claim 5, characterized in that the facility is a passenger transport means, and that the telecommunication network is a public mobile radiotelephone network.

7. A telecommunication system according to claim 6, characterized in that a radio base station arranged on the ground carries out the telecommunication between the public mobile radiotelephone network and the private branch exchange, and that the assignment facility is connected via a data link with the private branch exchange.

8. A telecommunication system according to claim 5, characterized in that the private branch exchange and its internal communication transmitting terminals contain wireless transceivers in order to communicate with each other by means of radio signals or by means of infrared signals.

9. A telecommunication system according to claim 5, characterized in that a card reading facility is connected via a data link with the assigning facility, said card reading facility reading data for identifying the personal call number from a data carrier that is provided for the use of the private telecommunication transmitting terminal by the person, said data carrier comprising a SIM card for the use of the mobile radiotelephone network.

10. A telecommunication network for passenger transport companies, in particular for airlines, ocean lines or railroad companies, comprising a telecommunication system according to claim 5 with at least two private branch exchanges each provided in a passenger transport means and each of which is assigned its own special call number of the public telecommunication network.

11. A method for establishing a telecommunication connection to a person inside a self-contained object, comprising:

(a) associating a personal call number of the person, under which the person is called in a communication network outside the self-contained object, with an identification number of an internal telecommunication terminal, which is located inside the self-contained object;

(b) storing the association of the personal call number with the identification number of the internal telecommunication terminal, wherein the association is stored outside the self-contained object;

(c) dialing the personal call number of the person to initiate a call to the person;

(d) matching the person's personal call number with the identification number of the internal telecommunication terminal, if the person in the self-contained object is located outside a coverage area of the communication network;

(e) forwarding the call and the identification number of the internal telecommunication terminal to a private branch exchange in the self-contained object;

(f) in the private branch exchange, identifying the internal telecommunication terminal inside the self-contained object via the identification number of the internal telecommunication terminal; and (g) forwarding the call from the private branch exchange to the identified internal telecommunication terminal.

12. A telecommunication system, comprising:

at least one internal telecommunication terminal inside a self-contained object, wherein the self-contained object is located outside a coverage of a communication network to which a person subscribes;

an association arrangement located outside the self-contained object to store an association of a personal call number of the person, under which the person is called in the communication network, with an identification number of the internal telecommunication terminal; and a private branch exchange inside the self-contained object, to which the identification number of the internal telecommunication terminal is forwarded, if the person is called in the communication network and after the personal call number of the person is matched with the associated identification number of the internal telecommunication terminal.

\* \* \* \* \*